United States Patent Office 3,050,549
Patented Aug. 21, 1962

3,050,549
PREPARATION OF AROYL CHLOROALKYL
ESTERS
Samuel Gelfand, Niagara Falls, N.Y., assignor to Hooker Chemical Corporation, Niagara Falls, N.Y., a corporation of New York
No Drawing. Filed July 24, 1959, Ser. No. 829,235
10 Claims. (Cl. 260—475)

This invention relates to a new and useful method of preparing aroyl chloroalkyl esters. This invention further relates to the process of reacting an aromatic compound containing among its substituents one or more trichloromethyl groups with an aliphatic diol to give an aromatic ester with a chlorine substituent in the alcohol portion of the molecule, replacing one of the hydroxyl groups.

I have found that aromatic trichloromethyl compounds react with aliphatic diols to give aroyl chloroalkyl esters directly. The reaction may be exemplified by the following equation for benzotrichloride and ethylene glycol.

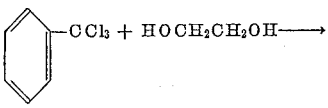

Benzotrichloride + ethylene glycol

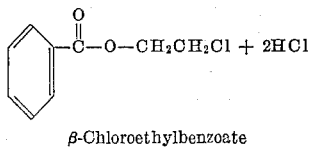

β-Chloroethylbenzoate

In the reaction, the trichloromethyl group of the benzotrichloride reacts with the diol with evolution of hydrogen chloride, replacement of one of the hydroxyl groups of the glycol by chlorine and formation of an ester group between the other hydroxyl group and the trichloromethyl group, with conversion of the trichloromethyl group ($-CCl_3$) to a

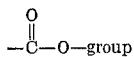

—group

The class of aromatic trichloromethyl compounds, which may be assigned the general formula X—Ar—$CCl_3$, may be taken from any aryl group substituted with a trichloromethyl group ($-CCl_3$). The aromatic radical may contain substituents other than hydrogen which may be designated by X, such as halogen, $CCl_3$, alkyl, carbalokoxy such as carbethoxyl, etc. Among the aromatic systems or radicals which are operative in this invention are benzene, naphthalene, anthracene, pyridine, biphenyl, etc. The diol may be chosen from the class of aliphatic diols in which the hydroxyl groups are adjacent to each other or separated by one or more methylene groups.

Among the aromatic trichloromethyl compounds which may be employed in the present invention are benzotrichloride, pentachloroorthoxyene, hexachloro-m-xylene, hexachloro paraxylene, 3-trichloromethyl pyridine, p-p'-trichloromethylbiphenyl, m-chlorobenzotrichloride, α and β trichloromethylnaphthalene, dichlorobenzotrichlorides, polychlorobenzotrichlorides, etc.

Among the operative class of diols are ethylene glycol, propylene glycol, 2,3-butylene glycol, 1,4-butylene glycol, hexylene glycol, diethylene glycol, triethylene glycol, dipropylene glycol, polyethylene glycol, etc.

The reaction is generally accomplished by heating and stirring an equimolar mixture of the reactants until the evolution of hydrogen chloride ceases. The particular reaction product is readily isolated from the reaction mixture usually by direct distillation of the crude reaction mixture.

The optimum reaction temperature will vary with the reactivity of the particular starting reactants. It will generally be in the range of 70–170 degrees centigrade. It will also depend on whether a solvent or catalyst is used. The use of a solvent generally will require a higher optimum temperature while the use of a catalyst will generally enable the use of lower temperatures. For any particular system the temperature chosen will generally be one at which the evolution of hydrogen chloride proceeds at a satisfactory and even rate.

The reactions of this invention can be carried out without a catalyst but generally are greatly facilitated by employing a catalyst such as zinc chloride, ferric chloride, boron trifluoride or other Lewis acid catalyst. The amount of catalyst employed may vary but is usually from 0.001 to about 5 mole percent of the reagents.

A solvent is not generally necessary but one can be used to moderate or facilitate the reaction. Among solvents which may be so used are toluene, xylene, chlorobenzene or other solvents of high enough boiling point to maintain the required reaction temperature and that do not react with either of the selected starting reagents.

A base such as sodium carbonate can be used to neutralize the hydrogen chloride liberated, or the hydrogen chloride may be evolved as a gas and collected.

The reaction products are easily isolated, generally by direct fractional distillation of the crude reaction product.

The ratio of the starting reagents may be varied but it is usually preferable to use equimolar amounts.

The products are useful as chemical intermediates, solvents and agricultural chemicals.

The teachings and findings of this invention may be more fully understood by considering the following examples which are set forth only with the intention of illustrating the invention and not in any way limiting it.

*Example 1*

Five grams of zinc chloride were added to a mixture of one mole (195 grams) of benzotrichloride and one mole (62 grams) of ethylene glycol in a one-liter, three-necked flask. The mixture was stirred and heated to 110 degrees centigrade at which temperature the reaction started. Heating was stopped while the temperature rose to 140 degrees centigrade with vigorous HCl evolution. After a half hour, the reaction subsided. The mixture was then heated to 150 degrees centigrade for an additional half hour. The product was distilled directly from the reaction flask through a two-foot evacuated Vigreux column to given an 87.4 percent yield (160 grams) of β-chloroethylbenzoate having a boiling point of 138–140 degrees centigrade at 7 mm. pressure. Analysis calculated for $C_9H_9O_2Cl$. Theory: Cl, 19.3%. Found: 19.4%.

*Example 2*

A mixture of 1.0 mole (195 grams) of benzotrichloride, 1.0 mole of propylene glycol (76 grams), and 5 grams of zinc chloride was reacted as in Example 1. Distillation gave a 59 percent yield (118 grams) of chloropropyl benzoate having a boiling point of 71–78 degrees centigrade (0.3 mm. Hg). Analysis calculated for $C_{10}H_{11}O_2Cl$. Theory: Cl, 17.9%. Found: 17.6%.

*Example 3*

A one-liter three-necked flask was charged with 313 grams (1.0) mole of m-xylene hexachloride, 124 grams (2.0 moles) of ethylene glycol, 2 grams of zinc chloride and 300 grams of monochlorobenzene as solvent. The mixture was stirred and heated at 130–145 degrees centigrade until the evolution of hydrogen chloride ceased.

The solvent was removed and the product distilled at reduced pressure to give 200 grams (69 percent yield) of di(β-chloroethyl)-isophthalate, having a boiling point of 162–165 degrees centigrade at 0.15 mm. Hg. Analysis calculated for: $C_{12}H_{12}O_4Cl_2$. Theory: Cl, 24.4%. Found: 24.5%.

*Example 4*

A mixture of 107.5 grams of benzotrichloride (0.55 mole), 50 grams of 2,3-butanediol (0.55 mole) and 0.5 gram of zinc chloride was reacted as in Example 1. Distillation of the crude product gave 96 grams (82 percent yield) of 3-chloroisobutylbenzoate having a boiling point of 127–131 degrees centigrade at 9 mm. Hg pressure. Analysis calculated for $C_{11}H_{13}O_2Cl$. Theory: Chlorine 16.7%. Found: 16.7%.

*Example 5*

A mixture of 98 grams benzotrichloride (0.5 mole), 45 grams 1,4-butanediol (0.5 mole) and 0.5 gram zinc chloride was stirred and heated to reflux for one and one-half hours. Distillation of the crude reaction product gave 60 grams (57 percent) of omega-chlorobutyl benzoate, having a boiling point of 101–105 degrees centigrade at 0.5 mm. Hg pressure. Analysis calculated for $C_{11}H_{13}O_2Cl$. Theory: Cl, 16.7%. Found: 16.2%.

*Example 6*

An equimolar mixture of benzotrichloride and diethylene glycol was heated at 127 degrees centigrade at which temperature there was a vigorous evolution of hydrogen chloride. No catalyst was required. After the evolution of HCl had ceased, the product was distilled. The product $C_6H_5CO_2CH_2CH_2OCH_2CH_2Cl$ had a boiling point of 165–179 degrees centigrade at 7 mm. Hg pressure. Analysis calculated for $C_{11}H_{13}O_3Cl$. Theory: Cl, 15.5%. Found: 14.7%.

It is to be understood that the invention is not limited to the specific examples which have been offered merely as illustrative and that modifications may be made within the scope of the appended claims without departing from the spirit of the invention.

I claim:
1. The process of preparing aroyl chloroalkyl esters in which the chlorine is at a locus in the alkyl chain previously occupied by an OH group and in which the ester is between the aroyl and the alkyl groups which comprises reacting (1) a material having the formula

$$X-Ar-CCl_3$$

wherein Ar is an aryl radical selected from the group consisting of phenyl, naphthyl, anthracyl, and biphenylyl, and X is selected from the group consisting of H, halogen, $CCl_3$, lower alkyl and carb-lower alkoxy with (2) an aliphatic diol selected from the group consisting of mono-, di-, tri-, and poly-lower alkylene glycols.

2. The process according to claim 1 when carried out at a temperature from about seventy to about one hundred and seventy degrees centigrade.

3. The process according to claim 1 when carried out in the presence of a catalyst selected from the group consisting of zinc chloride and ferric chloride.

4. The process according to claim 1 when carried out in the presence of an inert solvent.

5. The process of preparing β-chloroethylbenzoate which comprises reacting benzotrichloride with ethylene glycol.

6. The process of preparing chloropropylbenzoate which comprises reacting benzotrichloride with propylene glycol.

7. The process of preparing di(β-chloroethyl)-isophthalate which comprises reacting m-xylene hexachloride with ethylene glycol.

8. The process of preparing 3-chloroisobutylbenzoate which comprises reacting benzotrichloride with 2,3-butanediol.

9. The process of preparing omega-chlorobutylbenzoate which comprises reacting benzotrichloride with 1,4-butanediol.

10. The process for preparing β-chloro-β'-benzoyloxy diethylether which comprises reacting benzo trichloride with diethylene glycol.

References Cited in the file of this patent

UNITED STATES PATENTS 2,513,504    McFarlane et al. _____ July 4, 1950
2,871,256    Ivins et al. _____ Jan. 27, 1959

OTHER REFERENCES

Hickinbottom: "Reactions of Organic Compounds," page 104, Longmans, Green and Company, 1948.

Wagner et al.: "Synthetic Organic Chemistry," page 89, J. Wiley, 1953.

Shriner et al.: "Systematic Identification of Organic Compounds," pages 117 to 119 (1956).